US010754791B2

(12) United States Patent
Britto et al.

(10) Patent No.: US 10,754,791 B2
(45) Date of Patent: Aug. 25, 2020

(54) SOFTWARE TRANSLATION PREFETCH INSTRUCTIONS

(71) Applicant: International Business Machines Corporation, Armonk, NY (US)

(72) Inventors: Vivek Britto, Austin, TX (US); Bryant Cockcroft, Austin, TX (US); John Schumann, Austin, TX (US); Tharunachalam Pindicura, Austin, TX (US); Shricharan Srivatsan, Austin, TX (US); Yan Xia, Austin, TX (US); Aishwarya Dhandapani, Folsom, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/237,780

(22) Filed: Jan. 2, 2019

(65) Prior Publication Data
US 2020/0210346 A1 Jul. 2, 2020

(51) Int. Cl.
G06F 12/1027 (2016.01)
G06F 12/0862 (2016.01)

(52) U.S. Cl.
CPC ...... G06F 12/1027 (2013.01); G06F 12/0862 (2013.01); G06F 2212/68 (2013.01)

(58) Field of Classification Search
CPC .................................................. G06F 12/1027
See application file for complete search history.

(56) References Cited

U.S. PATENT DOCUMENTS

| 2014/0281351 A1 | 9/2014 | Topp et al. |
| 2014/0281352 A1* | 9/2014 | Venkatsubramanian ........ G06F 12/0862 711/205 |
| 2018/0189062 A1 | 7/2018 | Baghsorkhi et al. |

FOREIGN PATENT DOCUMENTS

WO 2018130802 A1 7/2018

* cited by examiner

Primary Examiner — Edward J Dudek, Jr.
(74) Attorney, Agent, or Firm — Cantor Colburn LLP; Bryan Bortnick

(57) ABSTRACT

Examples of techniques for software translation prefetch instructions are described herein. An aspect includes, based on encountering a translation prefetch instruction in software that is being executed by a processor, determining whether an address translation corresponding to the translation prefetch instruction is located in a translation lookaside buffer (TLB) of the processor. Another aspect includes, based on determining that the address translation is not located in the TLB, issuing an address translation request corresponding to the translation prefetch instruction. Another aspect includes storing an address translation corresponding to the address translation request in the TLB.

18 Claims, 4 Drawing Sheets

SOFTWARE TRANSLATION PREFETCH INSTRUCTIONS

BACKGROUND

The present techniques relate to processors. More specifically, the techniques relate to handling of software translation prefetch instructions in processors.

Cache memory may significantly improve performance in computer processors. Generally, a cache is a relatively small, fast memory used by a central processing unit of a computer that is used to avoid accesses to the computer's main memory. The cache may store copies of data from frequently used main memory locations. By keeping more frequently accessed instructions and data in the faster cache memory, the average memory access time may approach the access time of the cache. A cache miss may be costly because the data must then be fetched from a higher-level cache, main memory, or another processor's cache in a multiprocessor system, which may incur a delay since accessing another memory is slower than accessing a processor's local cache memory.

SUMMARY

According to an embodiment described herein, a system can include a processor to, based on encountering a translation prefetch instruction in software that is being executed by the processor, determine whether an address translation corresponding to the translation prefetch instruction is located in a translation lookaside buffer (TLB) of the processor. The processor can also, based on determining that the address translation is not located in the TLB, issue an address translation request corresponding to the translation prefetch instruction. The processor can also store an address translation corresponding to the address translation request in the TLB.

According to another embodiment described herein, a method can include, based on encountering a translation prefetch instruction in software that is being executed by a processor, determining whether an address translation corresponding to the translation prefetch instruction is located in a translation lookaside buffer (TLB) of the processor. The method can also include, based on determining that the address translation is not located in the TLB, issuing an address translation request corresponding to the translation prefetch instruction. The method can also include storing an address translation corresponding to the address translation request in the TLB.

According to another embodiment described herein, an apparatus can include hardware logic to, based on encountering a translation prefetch instruction in software that is being executed by a processor, determine whether an address translation corresponding to the translation prefetch instruction is located in a translation lookaside buffer (TLB) of the processor. The hardware logic can also, based on determining that the address translation is not located in the TLB, issue an address translation request corresponding to the translation prefetch instruction. The hardware logic can also store an address translation corresponding to the address translation request in the TLB.

DETAILED DESCRIPTION

Figure 1:
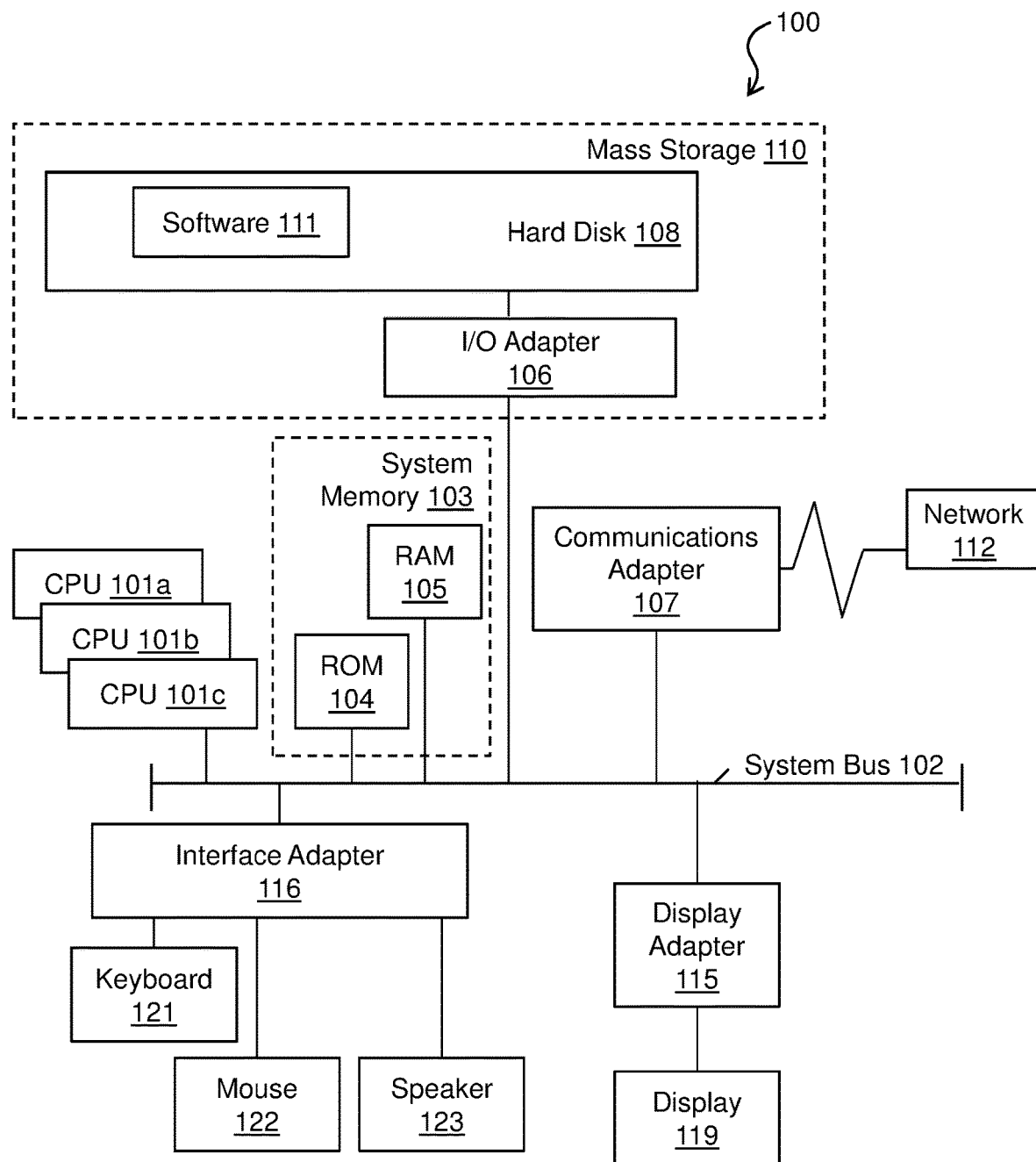
FIG. 1 is a block diagram of an example computer system for software translation prefetch instructions.

Embodiments of software translation prefetch instructions are provided, with exemplary embodiments being discussed below in detail. A translation prefetch instruction may be added to an instruction set architecture (ISA) of a processor, allowing a programmer to insert translation prefetch instructions into computer code. The translation prefetch instructions may reduce wait times associated with accessing relatively slow memories in the computer system.

A mechanism used to enhance the performance of cache memory is data prefetching. Data prefetching generally refers to the moving of data from memory to cache in anticipation of future accesses by the processor to the data, so as to hide memory latency. That is, data prefetching requests data from the memory subsystem prior to when the data is needed. If the correct data can be prefetched early enough, then the high latency of main memory can be hidden. Because microprocessors tend to be much faster than the memory where the program or data is kept, the program's instructions or data cannot be read fast enough to keep the microprocessor busy. By prefetching, the processor has the data from the memory before it will need it. In this way, the processor will not need to wait for the memory to provide its request.

Processors may include specialized hardware elements to support implementation of virtual memory. Such processors produce virtual addresses, and implement virtual to physical address translation mechanisms to map virtual addresses to physical addresses of memory locations in the main memory. The address translation mechanism may include one or more data structures (i.e., page tables) arranged to form a hierarchy. The page tables may be stored in the main memory and are maintained by operating system software. A highest-ordered page table may be located within the main memory. Where multiple page tables are used to perform the virtual-to-physical address translation, entries of the highest-ordered page table are base addresses of other page tables. Any additional page tables may be obtained from a storage unit and stored in the main memory as needed.

A base address of a memory page containing the highest-ordered page table may be stored in a register. The highest-ordered page table includes multiple entries. The entries may be base addresses of other page tables, or base addresses of pages including physical addresses corresponding to virtual addresses. A virtual address produced by the processor is divided into multiple portions, and the portions are used as indexes into the page tables. A lowest-ordered page table includes an entry storing a base address of the page including the physical address corresponding to the virtual address. The physical address is formed by adding a lowest ordered or offset a portion of the virtual address to the base address in the selected entry of the lowest-ordered page table.

The above described virtual-to-physical address translation mechanism requires accessing one or more page tables in main memory (i.e., via page table lookups, or table walks). Such page table accesses may require significant amounts of time, and may negatively impact processor performance. Consequently, processors may include a translation lookaside buffer (TLB) for storing most recently used page table entries. The TLB is a cache in a central processing unit (CPU) that contains parts of the page table of the main memory, which translates from virtual into real memory addresses. The TLB improves the speed of virtual address translation because it stores, or caches, translated virtual to physical address mapping. The search key of the TLB may be a virtual address, and the search result that is output by a TLB search is the corresponding physical address. If a TLB search yields a match, the virtual to physical address translation is known and the physical address is used. If there is no match (i.e., a TLB miss), a translation request using the page table of the memory needs to be performed. Processing a translation request may take additional cycles to complete. Therefore, data fetching, or data prefetching may be delayed when data is requested that is at a memory location that is not mapped in the TLB.

Address translations may be prefetched to the TLB automatically by a processor if, for example, prefetching logic discerns a pattern in the address translations that are used by a particular software program. Addition of translation prefetch instructions to the ISA of the processor allows address translations to be prefetched if there is no discernable pattern. A programmer may insert translation prefetch instructions into software to ensure that address translations are prefetched for, for example, a subsequent data prefetch instruction in the software. Use of software translation prefetch instructions may provide an advantage when working with a data set in which the addresses in memory are discoverable in advance, yet do not show any discernible pattern which might be caught by hardware prefetching logic. By including multiple levels of software prefetching into computer code, the number of TLB misses and the average latency penalty may be reduced. A translation prefetch engine that handles the translation prefetch instructions may interface with, for example, a table walk unit to retrieve a requested virtual address translation. The table walk unit accesses one or more page tables, which may be stored in the main memory, to identify the virtual-to-physical address translation corresponding to a translation request.

A first software prefetch instruction for a virtual address may go through address translation. In a hot page type scenario, where a relatively large number of memory pages are accessed continuously, address translation may be a bottleneck that holds up execution in the processor. While all data accesses may be cache hits, the penalty incurred by being forced to table walk on every data access may negate a large amount of the potential gain from data prefetching. Translation prefetch instructions allow for the fetching of an address translation via a table walk without holding up the rest of the instruction pipeline. A translation prefetch instruction may prime an address translation for use by, for example, a subsequent data prefetch instruction in the software, or a demand load.

In some embodiments, separate instructions may load an address translation into both the TLB and a higher level translation cache. A translation prefetch instruction may pass through the processor pipeline until the translation prefetch instruction is loaded into an entry in the translation miss queue, at which point the translation prefetch instruction is finished (e.g., retired or completed) in the pipeline. After the translation prefetch instruction is loaded into the entry in the translation miss queue, the address translation corresponding to the translation prefetch instruction is performed, which may include a table walk. Retiring of the translation prefetch instruction in the pipeline avoids any holdup of other instructions in the pipeline due to, for example, limited reorder buffer entries or other resources in the pipeline. The address translation, including any table walk, occurs independently of any other instructions in the pipeline. Once the address translation is completed, the address translation will be loaded into the TLB (and/or higher level translation cache), and the translation miss queue entry is freed. The address translation will then be available for, for example, any subsequent data fetch or prefetch instructions to use.

Turning now to FIG. 1, a computer system 100 is generally shown in accordance with an embodiment. The computer system 100 can be an electronic, computer framework comprising and/or employing any number and combination of computing devices and networks utilizing various communication technologies, as described herein. The computer system 100 can be easily scalable, extensible, and modular, with the ability to change to different services or reconfigure some features independently of others. The computer system 100 may be, for example, a server, desktop computer, laptop computer, tablet computer, or smartphone. In some examples, computer system 100 may be a cloud computing node. Computer system 100 may be described in the general context of computer system executable instructions, such as program modules, being executed by a computer system. Generally, program modules may include routines, programs, objects, components, logic, data structures, and so on that perform particular tasks or implement particular abstract data types. Computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system 100 has one or more central processing units (CPU(s)) 101a, 101b, 101c, etc. (collectively or generically referred to as processor(s) 101). The processors 101 can be a single-core processor, multi-core processor, computing cluster, or any number of other configurations. The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and may include a basic input/output system (BIOS), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, which may be any appropriate operating system, such as the z/OS or AIX operating system from IBM Corporation, to coordinate the functions of the various components shown in FIG. 1.

Additional input/output devices are shown as connected to the system bus 102 via a display adapter 115 and an interface adapter 116 and. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by a display adapter 115, which may include a graphics controller to improve the performance of graphics intensive applications and a video controller. A keyboard 121, a mouse 122, a speaker 123, etc. can be interconnected to the system bus 102 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 1, the computer system 100 includes processing capability in the form of the processors 101, and, storage capability including the system memory 103 and the mass storage 110, input means such as the keyboard 121 and the mouse 122, and output capability including the speaker 123 and the display 119.

In some embodiments, the communications adapter 107 can transmit data using any suitable interface or protocol, such as the internet small computer system interface, among others. The network 112 may be a cellular network, a radio network, a wide area network (WAN), a local area network (LAN), or the Internet, among others. An external computing device may connect to the computing system 100 through the network 112. In some examples, an external computing device may be an external webserver or a cloud computing node.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments described herein with respect to computer system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
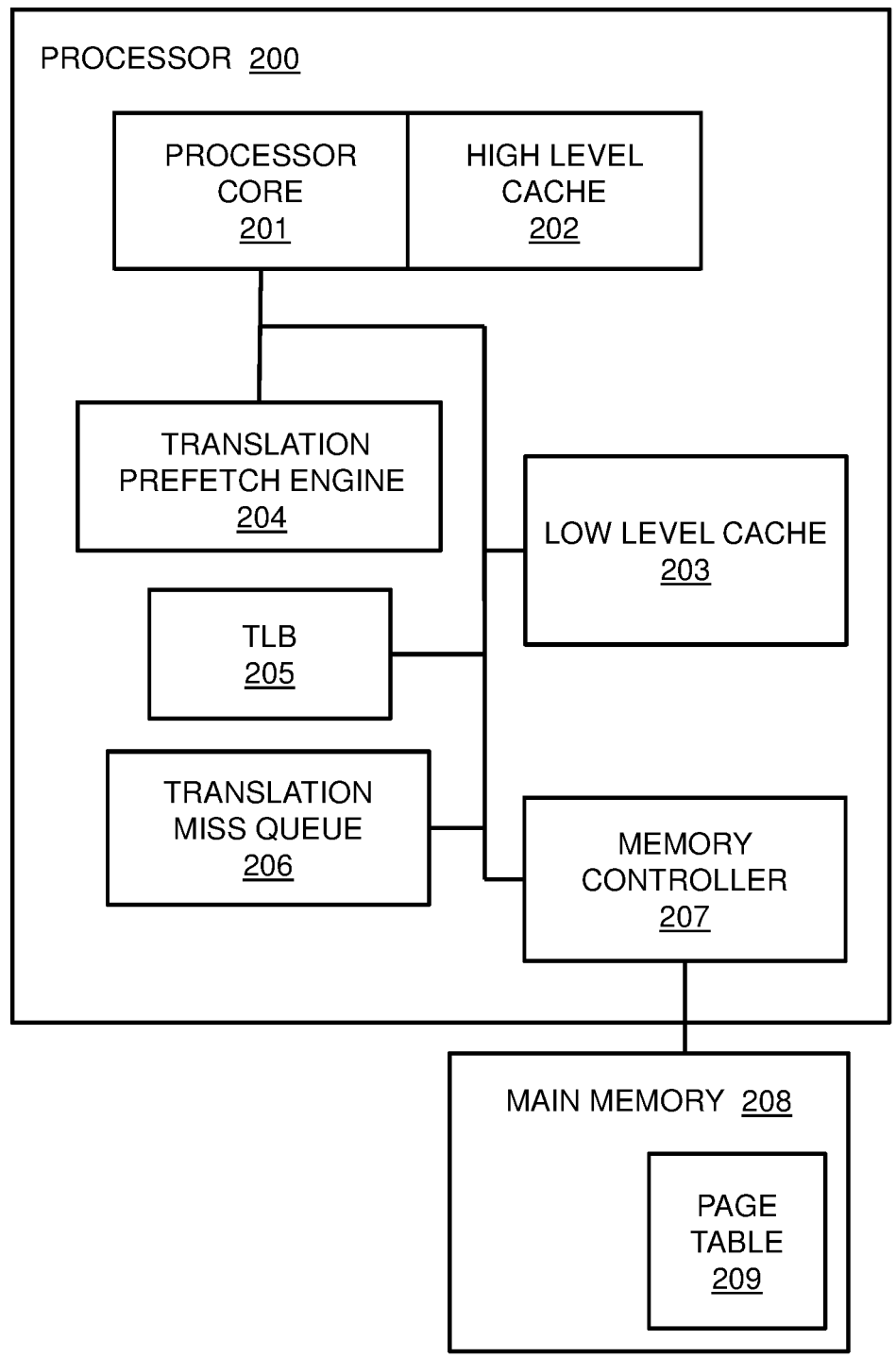
FIG. 2 is a block diagram of an example system for software translation prefetch instructions.

FIG. 2 is a block diagram of an example system comprising a processor 200 for software translation prefetch instructions. Processor 200 of FIG. 2 may comprise processor(s) 101 of computer system 100 of FIG. 1. Processor 200 includes a processor core 201, which may include an instruction pipeline for execution of instructions during the execution of software in the computer system (e.g., software 111 of FIG. 1) in which the processor 200 is located. The processor core 201 is in communication with a high level cache 202, which may be a relatively small, fast memory for use by the processor core 201 during execution of instructions. The processor 200 further includes a low level cache 203, which also stores data for use by the processor core 201 during execution of instructions. The low level cache 203 may be a larger, slower memory than the high level cache 202. High level cache 202 and low level cache 203 are shown for illustrative purposes only; a processor 200 may include any appropriate number of levels of cache in various embodiments. Processor 200 is also in communication with a main memory 208 via a memory controller 207; main memory 208 may correspond to system memory 103 of FIG. 1. Data is read from and written to the main memory 208 by the processor 200 via memory controller 207 during execution of software. Accessing data in the main memory 208 may be relatively slow as compared to low level cache 203. In order to expedite execution of instructions by processor core 201, data may be prefetched from the main memory 208 to the cache memory (e.g., low level cache 203 and/or high level cache 202) in the processor 200 for use by the processor core 201.

Processor 200 further includes a translation prefetch engine 204, which may handle translation prefetch instructions that are encountered during execution of the software 111. A translation prefetch instruction may be part of the ISA of the processor 200, and a plurality of translation prefetch instructions may be included in software 111 by a programmer. The translation prefetch engine 204 is in communication with a TLB 205 and a translation miss queue 206 of the processor 200. A translation prefetch instruction causes the translation prefetch engine to prefetch an address translation (e.g., a translation from a virtual memory address to a real memory address) from page table 209 in the main memory 208 for storage in the TLB 205. The processor core 201 may then access the address translation in the TLB 205 when the address translation is needed. In some embodiments, a translation prefetch instruction may cause an address translation to be stored in a cache of the processor 200, e.g., low level cache 203 or high level cache 202. Translation prefetch engine 204 is discussed in further detail below with respect to FIG. 3 and FIG. 4.

It is to be understood that the block diagram of FIG. 2 is not intended to indicate that the processor 200 is to include all of the components shown in FIG. 2. Rather, the processor 200 can include any appropriate fewer or additional components not illustrated in FIG. 1 (e.g., additional memory components, cores, controllers, modules, logic, interfaces, etc.). Further, the embodiments described herein with respect to processor 200 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 3:
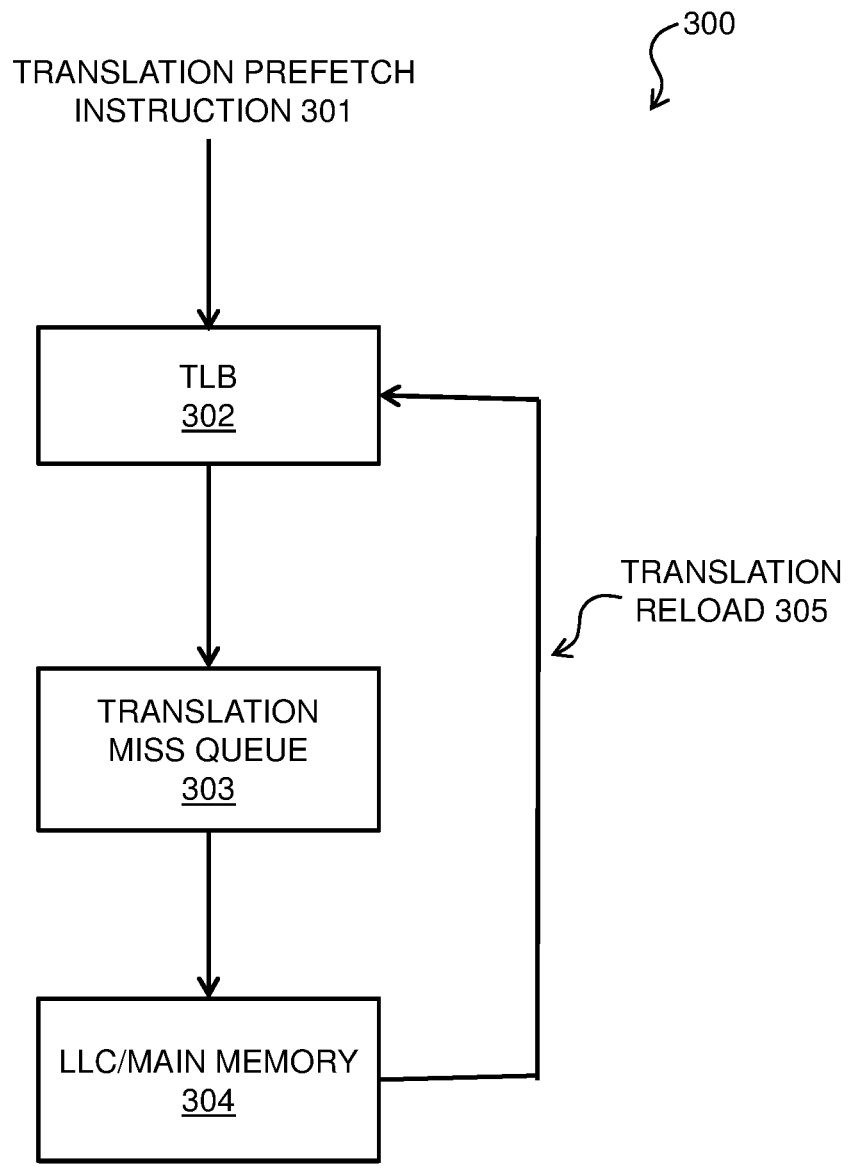
FIG. 3 is a process flow diagram of an example method for software translation prefetch instructions.

FIG. 3 is a process flow diagram of an example method 300 for software translation prefetch instructions. The method 300 can be implemented with any suitable computing device, such as the computer system 100 of FIG. 1. Method 300 of FIG. 3 may be implemented in processor 200 of FIG. 2. Method 300 illustrates handling of a translation prefetch instruction 301. When the translation prefetch instruction 301 is encountered in software (such as software 111 of FIG. 1), the processor pipeline notifies the translation prefetch engine 204 to search the TLB 302 for the translation. The search may be performed based on a virtual address associated with the translation prefetch instruction. TLB 302 may correspond to TLB 205 of FIG. 2. The TLB 302 may include a plurality of entries, each entry including a virtual memory address and an associated real memory address. If the requested translation is found in the TLB 302 (i.e., there is a TLB hit), there is no need to prefetch the translation corresponding to the translation prefetch instruction 301 from main memory, and method 300 ends. If the translation is not found in the TLB (i.e., there is a TLB miss), a translation request corresponding to the translation prefetch instruction 301 is stored in an entry in the translation miss queue 303. The translation miss queue 303 may correspond to translation miss queue 206 of FIG. 2. Entries in the translation miss queue 303 are processed by accessing page tables (e.g., page table 209), which may be located in a main memory/lowest level cache 304 (e.g., main memory 208 or low level cache 203) of the processor 200. When the translation corresponding to the translation prefetch instruction 301 has been performed, there is a translation reload 305, in which the translation corresponding to the translation prefetch instruction 301 is stored in the TLB 302 for use by the processor core 201. After the translation reload 305 has been performed, the entry in the translation miss queue 303 is released, and method 300 ends for the particular translation prefetch instruction 301. Each translation prefetch instruction that is encountered by the processor 200 may be handled according to method 300.

The process flow diagram of FIG. 3 is not intended to indicate that the operations of the method 300 are to be executed in any particular order, or that all of the operations of the method 300 are to be included in every case. Additionally, the method 300 can include any suitable number of additional operations.

Figure 4:
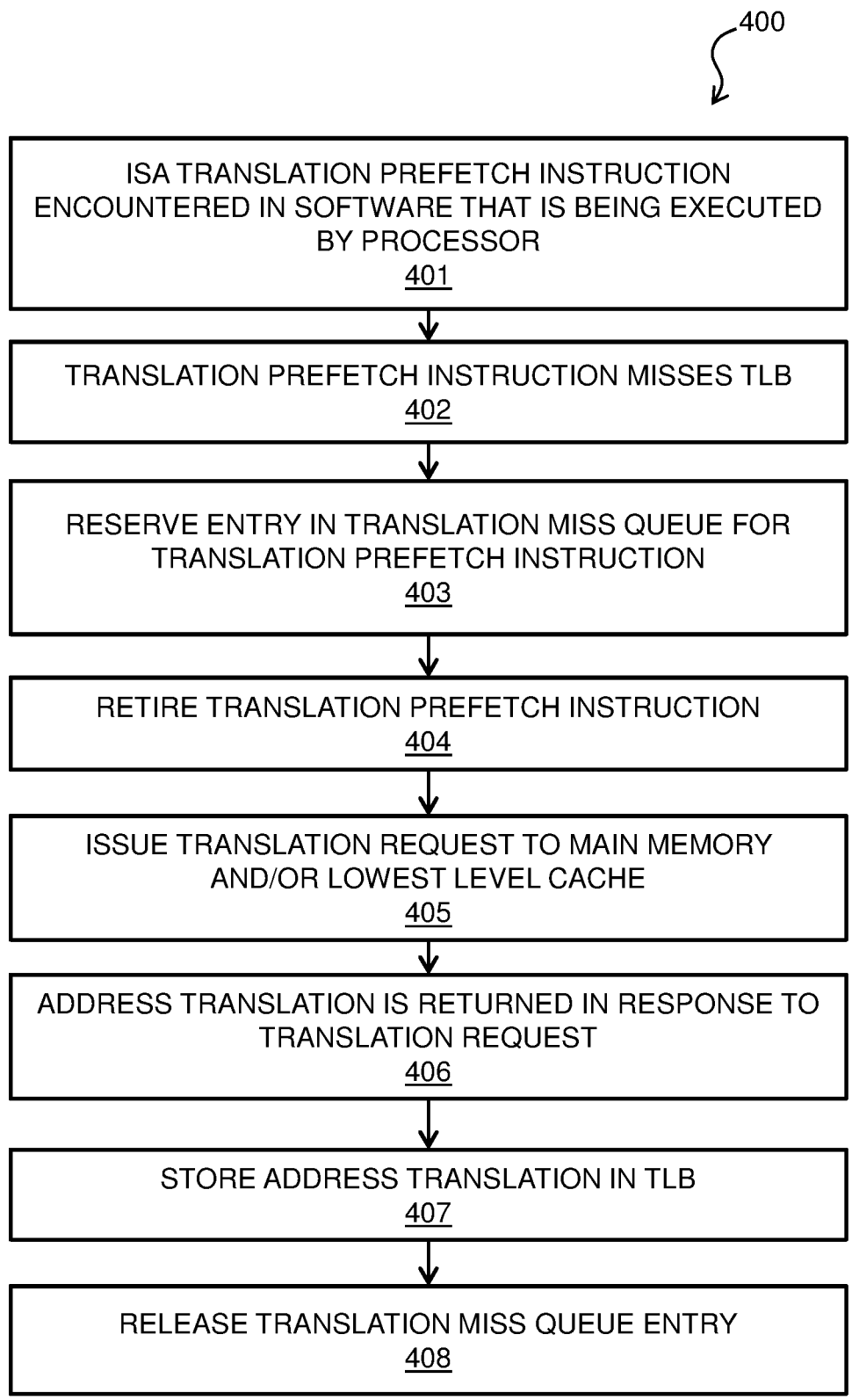
FIG. 4 is a process flow diagram of another example method for software translation prefetch instructions.

FIG. 4 is a process flow diagram of an example method 400 for software translation prefetch instructions. The method 400 can be implemented with any suitable computing device, such as the computer system 100 of FIG. 1. Method 400 of FIG. 4 may be implemented in processor 200 of FIG. 2. In block 401 of FIG. 4, a translation prefetch instruction, which is part of the ISA of the processor 200, is encountered in software (e.g., software 111) that is being executed by the processor 200. The translation prefetch instruction may include a virtual memory address in some embodiments. In block 402, the translation corresponding to the translation prefetch instruction misses the TLB 205. Next, in block 403, an entry is reserved in the translation miss queue 206 for the translation prefetch instruction. In block 404, based on the entry being reserved in the translation miss queue 206, the translation prefetch instruction is retired (or completed) in the pipeline of the processor core 201. In some embodiments, processor core 201 may handle a limited number of instructions simultaneously; retiring the translation prefetch instruction allows the processor core 201 to begin processing another instruction while the translation prefetch instruction is handled by the translation prefetch engine 204.

In block 405, an address translation request is issued by the translation prefetch engine 204 based on the entry corresponding to the translation prefetch instruction in the translation miss queue 206. The address translation request may be sent to, for example, a table walk unit that performs the address translation by accessing a page table such as page table 209 in the main memory 208 of FIG. 2. In some embodiments, the table walk unit may access a page table in a lowest level cache (e.g., low level cache 203) of the processor 200. In block 406, an address translation is returned to the translation prefetch engine 204 in response to the address translation request of block 405. In block 407, the address translation is stored in the TLB 205. In some embodiments, the address translation that is received in block 406 may be stored in a cache (e.g., high level cache 202 or low level cache 203) of the processor 200 in block 407. In such embodiments, the software translation prefetch instruction may specify where to store the address translation. The address translation corresponding to the translation prefetch instruction in the TLB may be used by, for example, a subsequent data prefetch instruction in the software, thereby reducing the amount of time required to perform the data prefetch. In block 408, it is determined that processing of the translation prefetch instruction is complete, and the entry in the translation miss queue 206 corresponding to the translation prefetch instruction is released.

The process flow diagram of FIG. 4 is not intended to indicate that the operations of the method 400 are to be executed in any particular order, or that all of the operations of the method 400 are to be included in every case. Additionally, the method 400 can include any suitable number of additional operations.

The present techniques may be a system, a method or an apparatus. The flowchart and block diagrams in the Figures illustrate the architecture, functionality, and operation of possible implementations of systems, methods, and apparatus according to various embodiments of the present techniques. In this regard, each block in the flowchart or block diagrams may represent a module, segment, or portion of logic for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising a processor configured to:
based on encountering a translation prefetch instruction in software that is being executed by the processor:
   determining whether an address translation corresponding to the translation prefetch instruction is located in a translation lookaside buffer (TLB) of the processor;
   based on determining that the address translation is not located in the TLB, issuing an address translation request corresponding to the translation prefetch instruction; and
   storing an address translation corresponding to the address translation request in the TLB;

wherein the translation prefetch instruction is located before a data prefetch instruction in the software, and wherein the data prefetch instruction uses the address translation corresponding to the translation prefetch instruction in the TLB.

2. The system of claim 1, wherein the translation prefetch instruction corresponds to an instruction set architecture (ISA) of the processor.

3. The system of claim 1, the processor configured to:
based on determining that the address translation is not located in the TLB, reserve an entry corresponding to the translation prefetch instruction in a translation miss queue.

4. The system of claim 3, the processor configured to:
based on reserving the entry corresponding to the translation prefetch instruction in the translation miss queue, retire the translation prefetch instruction in a pipeline of the processor.

5. The system of claim 3, the processor configured to:
based on storing the address translation corresponding to the address translation request in the TLB, release the entry corresponding to the translation prefetch instruction in the translation miss queue.

6. The system of claim 1, wherein the translation prefetch instruction comprises a virtual memory address, and wherein the address translation comprises a real memory address.

7. A computer-implemented method, comprising:
based on encountering a translation prefetch instruction in software that is being executed by a processor:
determining, by the processor, whether an address translation corresponding to the translation prefetch instruction is located in a translation lookaside buffer (TLB) of the processor;
based on determining that the address translation is not located in the TLB, issuing an address translation request corresponding to the translation prefetch instruction; and
storing an address translation corresponding to the address translation request in the TLB;
wherein the translation prefetch instruction is located before a data prefetch instruction in the software, and wherein the data prefetch instruction uses the address translation corresponding to the translation prefetch instruction in the TLB.

8. The computer-implemented method of claim 7, wherein the translation prefetch instruction corresponds to an instruction set architecture (ISA) of the processor.

9. The computer-implemented method of claim 7, further comprising:
based on determining that the address translation is not located in the TLB, reserve an entry corresponding to the translation prefetch instruction in a translation miss queue.

10. The computer-implemented method of claim 9, further comprising:
based on reserving the entry corresponding to the translation prefetch instruction in the translation miss queue, retire the translation prefetch instruction in a pipeline of the processor.

11. The computer-implemented method of claim 9, further comprising:
based on storing the address translation corresponding to the address translation request in the TLB, release the entry corresponding to the translation prefetch instruction in the translation miss queue.

12. The computer-implemented method of claim 7, wherein the translation prefetch instruction comprises a virtual memory address, and wherein the address translation comprises a real memory address.

13. A computer program product comprising a computer readable storage medium having program instructions embodied therewith, the program instructions executable by one or more processors to cause the one or more processors to perform operations comprising:
based on encountering a translation prefetch instruction in software that is being executed by a processor:
determining whether an address translation corresponding to the translation prefetch instruction is located in a translation lookaside buffer (TLB) of the processor;
based on determining that the address translation is not located in the TLB, issuing an address translation request corresponding to the translation prefetch instruction; and
storing an address translation corresponding to the address translation request in the TLB;
wherein the translation prefetch instruction is located before a data prefetch instruction in the software, and wherein the data prefetch instruction uses the address translation corresponding to the translation prefetch instruction in the TLB.

14. The computer program product of claim 13, wherein the translation prefetch instruction corresponds to an instruction set architecture (ISA) of the processor.

15. The computer program product of claim 13, further comprising:
based on determining that the address translation is not located in the TLB, reserve an entry corresponding to the translation prefetch instruction in a translation miss queue.

16. The computer program product of claim 15, further comprising:
based on reserving the entry corresponding to the translation prefetch instruction in the translation miss queue, retire the translation prefetch instruction in a pipeline of the processor.

17. The computer program product of claim 15, further comprising:
based on storing the address translation corresponding to the address translation request in the TLB, release the entry corresponding to the translation prefetch instruction in the translation miss queue.

18. The computer program product of claim 13, wherein the translation prefetch instruction comprises a virtual memory address, and wherein the address translation comprises a real memory address.

* * * * *